Aug. 12, 1947.  E. B. WIGGINS  2,425,500
VALUED COUPLING
Filed July 7, 1943  2 Sheets-Sheet 1
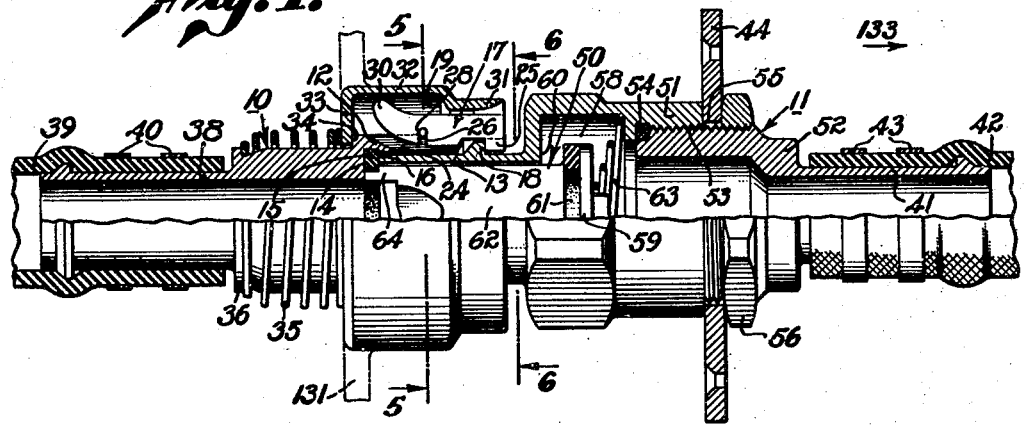
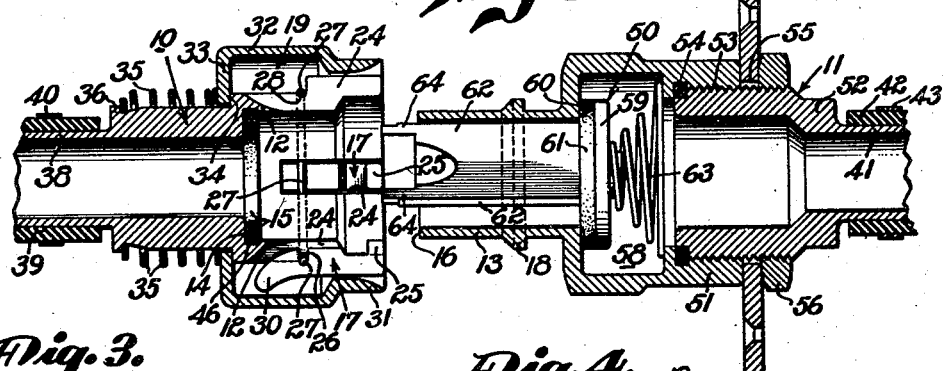
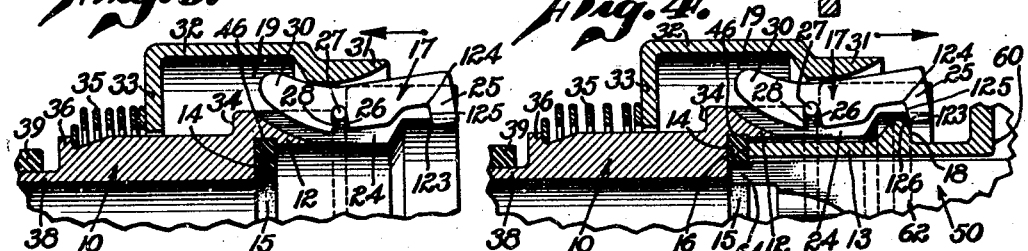
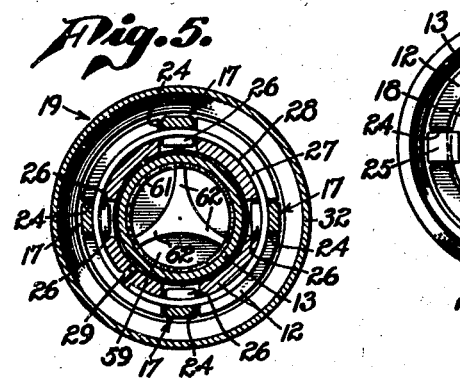
Inventor,
Earl B. Wiggins, deceased
Irene Lane Wiggins,
Executrix.
BY
ATTORNEY.

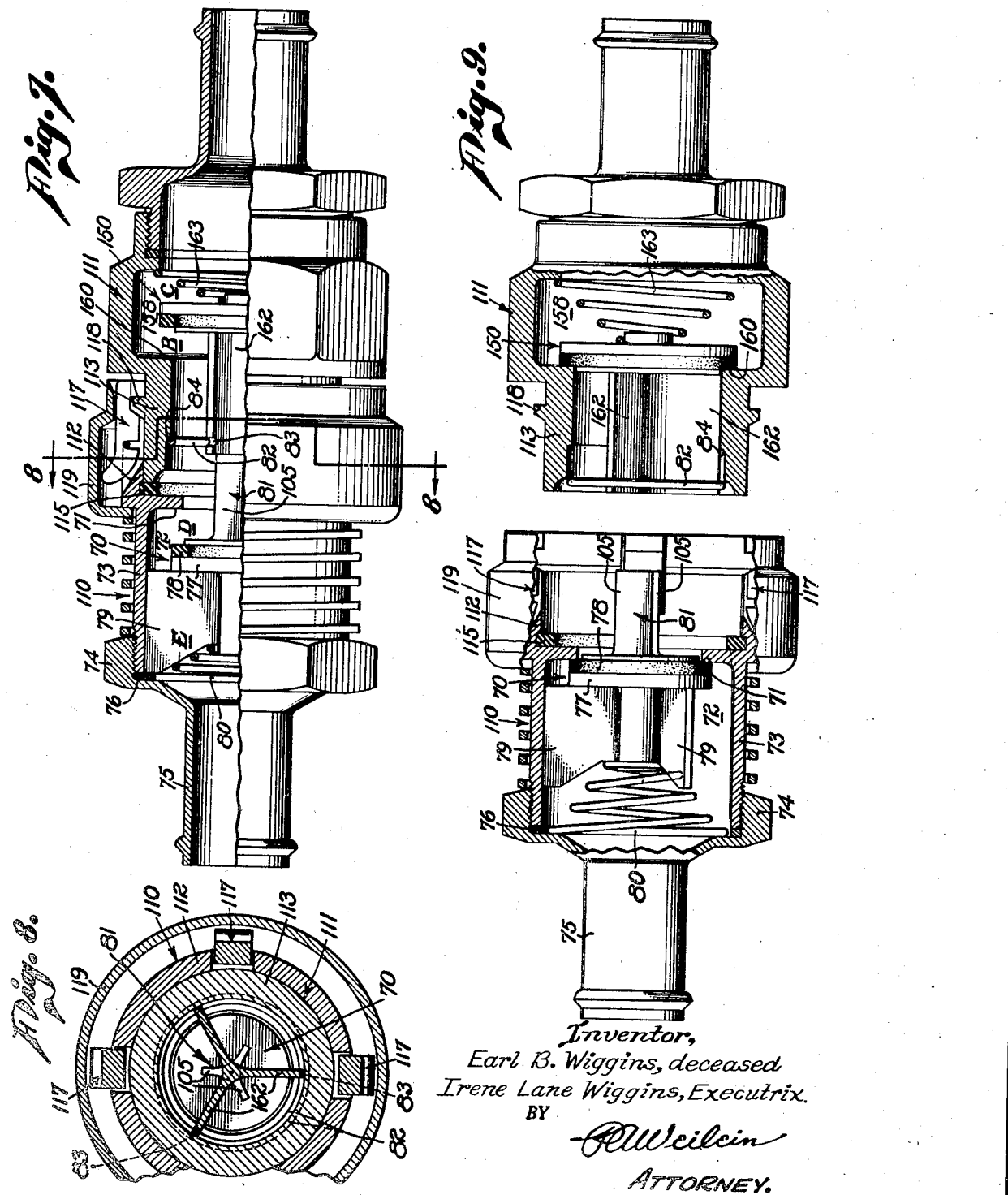

Patented Aug. 12, 1947

2,425,500

UNITED STATES PATENT OFFICE 2,425,500

VALVED COUPLING

Earl B. Wiggins, deceased, late of Los Angeles, Calif., by Irene Lane Wiggins, executrix, Los Angeles, Calif.

Application July 7, 1943, Serial No. 493,690

10 Claims. (Cl. 284—19)

This invention relates to couplings for conduits or the like used for conveying fluids and more particularly to such coupling incorporating a valve structure for automatically closing the conduit when the coupling is disconnected.

The valve structure contemplated by the present invention is shown by way of example as incorporated in a quick acting coupling of the type disclosed in a copending application entitled "Coupling," filed by Irene Lane Wiggins, executrix of the last will and testament of the inventor Earl B. Wiggins, deceased, filed June 15, 1943, and bearing Serial Number 490,882.

It is an object of this invention to provide a coupling incorporating means adapted to close automatically the conduit upon separation of the coupling members, said means being adapted to be automatically opened upon coupling of the members.

It is another object of this invention to provide a coupling, wherein the coupled members are adapted to separate in response to a predetermined axial force urging them apart, and incorporating valve means for automatically closing the conduit when the coupled members are disconnected.

It is still another object of this invention to provide a coupling incorporating a valve means for automatically closing each section of the conduit when the coupling members are disconnected, and to automatically open substantially simultaneously when the members are coupled.

It is another object of this invention to provide such a coupling wherein the actuating means for the valves is entirely within the coupling members when the members are disconnected.

It is another object of this invention to provide such a coupling wherein the flow of fluid through the coupling has no tendency to close the valve or to move the valve closure so as to restrict the fluid flow.

It is still another object of this invention to provide such a coupling wherein proper relative movement of the valve closures with respect to their seats is assured automatically at all times.

It is still another object of this invention to provide such a coupling wherein the valve means is so arranged as to insure that the valve means when open is always so positioned as to provide the maximum possible free passage for fluid flow past the valve closure.

It is still another object of this invention to provide such a coupling wherein no relative angular movement is required between the coupling members to match or align orifices for fluid flow.

It is a still further object of this invention to provide a coupling including means for securing the coupling members in coupled relation and a sealing gasket between the members in which said means and said gasket cooperate to cause movement of said valve closure controlling the passage through the coupling to a predetermined open position, and to accurately maintain said closure in such position.

This invention possesses many other advantages and has other objects which may be made more easily apparent from a consideration of several embodiments of the invention. For this purpose there are shown two forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is an elevation partly in section, showing a coupling embodying one form of the invention;

Figure 2 is a sectional view showing the coupling of Figure 1 disconnected;

Figures 3 and 4 are fragmentary detail sections showing steps in connecting the coupling members;

Figures 5 and 6 are cross sections taken on the correspondingly numbered lines of Figure 1;

Figure 7 is a view similar to Figure 1 showing a modified form of the invention;

Figure 8 is a section taken on line 8—8 of Figure 7; and

Figure 9 is a view showing the coupling of Figure 7 disconnected.

Referring to Figures 1 and 2 of the drawings it will be seen that the coupling comprises tubular members 10 and 11 having extensions 12 and 13 respectively telescoping one within the other. The outer extension as 12 has an interior annular shoulder 14 supporting a sealing ring or gasket 15 of resilient material, for example leather or Neoprene, upon which the inner end or face 16 of the other extension 13 is arranged to seat in a fluid tight manner. Means for securing or locking the members 10 and 11 in coupled relation are provided, comprising a plurality of dogs 17 mounted exteriorly on the extension 12 and engaging a shoulder 18 on the extension 13. An operating means comprising a ring 19 freely movable between limits on the member 10 is provided for urging the dogs 17 toward locking position, or out of locking position. The dogs 17 are so formed and supported with respect to the shoulder 18 that upon engaging the shoulder, any tendency of the members 10 and 11 to separate axially, as for example due to the resilience of the parts, has the effect of causing the dogs to grip the shoulder 18 more firmly; thus these dogs may be aptly termed "self-locking" dogs. This arrangement has several important advantages. For instance, no external restraining influence such as operating ring 19 is needed to maintain the dogs locked; further, increased longitudinal strain between the members incident to the use of the coupling has no tendency to release the locking means, but instead increases the locking effect.

As clearly shown in the drawings (see also Figures 3, 4, 5 and 6) the extension 12 has a number of axially extending slots 24 formed therein for accommodating the dogs 17. Each dog 17 has a projection or tooth 25 on its forward end for engaging the shoulder 18 and is provided with an inwardly directed slot 26 intermediate its ends for accommodating a retainer or pivotal supporting means 27. As shown in Figure 5, the retainer 27 is in the form of a spring ring accommodated in a groove 28 in the extension 12 and secured therein as by an inturned end 29. The rear ends 30 of the dogs 17 project outwardly.

The operating ring 19 has a forward portion 31 of reduced diameter for contacting the dogs 17, a larger rear portion 32 for freely accommodating the projecting rear portions 30 of the dogs, and a rear wall 33 engaging a stop 34 on the extension 12 which limits outward movement of the ring 19. The arrangement is such that movement of the ring 19 to the left from the shoulder 34 will cause the smaller portion 31 of the ring 19 to engage the projections 30 which swings each dog 17 to bring the tooth 25 thereon outwardly and out of engagement with the shoulder 18 (see Figure 3). Movement of the ring 19, in the opposite direction, to the right (Figure 4), will cause the portion 31 to urge the dogs 17 inwardly to bring the teeth 25 thereon into engagement with the shoulder 18.

As previously mentioned, the dogs 17 are arranged to be self locking. This is achieved as disclosed in the aforesaid copending application in the following manner. An inspection of Figures 3 and 4 will show that the lower or inner edge 123 of the locking surface of the tooth 25 is at a greater radial distance from the pivot 27 about which the tooth swings, than is the upper or outer edge 124. Thus, the locking surface 125 of the tooth 25 is at a progressively decreasing radial distance with respect to the pivot 27 between the points 123 and 124, and the surface 125 may be therefore correctly termed a wedging surface. The parts are so proportioned that with the resilient sealing ring or gasket 15 relaxed, and the end face 16 of the coupling section 11 in contact with said ring, the edge 123 will just engage the outer edge 126 of the shoulder 18; further inward movement of the dog 17 brings portions of the surface 125 of progressively decreasing radius against the edge 126 of the shoulder 18. This wedging action of the surface 125 urges the extension 13 inwardly of the extension 12 against the resilience of the gasket or sealing ring 15, which is thereby slightly compressed in an axial direction.

The tendency of this ring 15 to resume its normal shape urges the extension 13 outwardly of the extension 12, thus forcing the shoulder 18 tightly against the surfaces 125 on the dogs. This function of the resilient ring plays an important part in causing the dogs to be self-locking, inasmuch as the pressure between the abutting surfaces 18 and 125 creates a frictional force which resists outward displacement of the dogs with respect to the shoulder. It will be evident from an inspection of Figures 3 and 4 that the wedge angle of the surface 125, or in other words the angle formed between the surface 125 and a line drawn through point 123 and perpendicular to a radial line drawn from pivot 27 to point 123, is very small and is within the self-locking range. It is a well-known mechanical principle that a wedge is self-locking if the frictional force between the wedging surfaces exceeds the component force acting in a direction parallel to the wedging surfaces and tending to release the wedge. This condition prevails when the wedge angle is within the range between zero and an angle the tangent of which is equal to the coefficient of friction, and which is commonly referred to as the angle of friction. The range from zero to the friction angle is known as the self-locking range.

In the present instance, the wedge angle of the surface 125 is well within the self-locking range, and hence the frictional force developed between the surfaces 18 and 125 by the resilience of the ring 15 is greater than the component, acting parallel to the surfaces 18 and 125, of the force exerted by the ring. The dogs 17 are, in this manner, held in engagement with the shoulder 18 by forces developed by the resilient ring 15, and independently of the operating ring 19. The operating ring is not, therefore, subjected to any component of the axial force tending to separate the members 10 and 11. It functions solely as an actuator to move the dogs to and from their locking position.

Since the frictional force acting to retain the dogs 17 locked is but a small part of the force urging axial separation of the members 10 and 11, it follows that only a small force is required to disengage the dogs 17 from the shoulder 18, and due to the cam action between the inner surface of the reduced portion 31 on the operating ring 19 and the portions 30 of the dogs, a light force urging the ring 19 to the left as indicated by the arrow in Figure 3 is sufficient to cause disengagement of the dogs 17. An inspection of Figure 1 will show that the ring 19 may be moved a considerable distance from its normal position when it is free of the dogs 17, before engaging the dogs to cause their release. By providing this lost motion, it is possible to strike a blow on the dogs 17 with the ring 19, to assist in causing their release.

To prevent vibration displacing the ring 19 and possibly causing the dogs 17 to become disengaged, a light compression spring 35 is confined between the wall 33 of the ring 19 and a shoulder 36 on the member 10 for resiliently maintaining the ring 19 in its locking or outer position with the wall 33 against the stop 34.

The member 10 has a reduced portion 38 on which is secured a flexible hose or conduit 39, as by a conventional clamp 40. A similar hose or flexible conduit 42 may be secured to the member 11 by clamp 43 in a like manner. However, as shown in said copending application, one of the members 10 or 11 may have an exteriorly threaded extension adapted for receiving a metallic tube or pipe. The member 11 may also be provided with an integral mounting flange 44 if desired, whereby the coupling and associated conduits may be supported.

To couple the conduit 39 with the conduit 42, the ring 19 is retracted against the force of the spring 35 swinging the dogs 17 outwardly. The extension 12 is then slipped over the extension 13, the face 16 engaging the seat 15. The ring 19 is then moved ahead or to the right which forces the dogs 17 into locking position, as just described. When it is desired to uncouple and disconnect the members 12 and 13, the operating ring 19 is moved to the left against the force of the spring 35, which causes the dogs 17 to disengage the shoulder 18, allowing the members 12 and 13 to be separated by relative axial movement.

An important feature in preventing leakage between the members 10 and 11 is the arrangement of the resilient seal ring 15, as best shown in Figure 4. This ring 15 as previously mentioned is mounted on an annular shoulder 14, being retained thereon by means of a shallow annular recess or groove 46 in which the outer edge of the ring 15 is inserted. This is a very useful arrangement, since the resilience of the ring 15 permits it to be sufficiently deformed for easy removal or replacement when necessary; further, the ring 15 is securely held in place on the shoulder 14 without the need of detachable parts for this purpose. Hence, the coupling section 10 does not require disassembling for installation of the ring 15. This ring 15 is substantially wider than the face 16 and coaxial therewith. Thus, as the face 16 is urged against the ring 15, a central annulus of the ring is depressed so that the ring seals against both the inner and outer edges of the face 16. In this way leakage of pressure from either the outside or inside of the coupling past this face is effectively prevented.

It may be desirable to provide one or both of the coupling members 10 and 11 with valve means arranged to close automatically when the members are separated, thereby preventing discharge of fluid from one or both sections of the previously joined conduit.

In that form of the invention illustrated in Figures 1 to 6, the member 11 is shown as provided with such an automatic valve 50 for closing the conduit 42 when the coupling members 10 and 11 are separated. For this purpose the member 11 is formed in two sections, one section 51 carrying the tubular extension 13 and the other section 52 carrying the reduced portion 41. The sections 51 and 52 are threadedly connected at 53, a suitable gasket 54 being provided to prevent leakage between the sections. As shown, the supporting flange 44 is secured to the member 11 by having an opening 55 for accommodating the threaded portion of the section 52, a thin nut 56 on this threaded portion serving to clamp the flange 44 against the section 51.

The section 51 provides a chamber 58 for the head 59 of the valve 50 and provides a seat 60, which faces inwardly or away from the open end of the member 11, for a resilient facing 61 on the valve 50. The valve member 50 includes a plurality of guide wings 62 extending from the head 59 through the extension 13, serving to guide the valve member 50 for axial movement with respect to its seat 60 as well as to unseat the valve 50 when the members 10 and 11 are coupled. A compression spring 63 is provided for urging the valve 50 toward its seat. As shown in Figure 2, when the members 10 and 11 are separated, the valve 50 is seated by the spring 63 and the wings 62 have portions 64 which extend beyond the end of the extension 13. When the members 10 and 11 are coupled, these portions 64 engage a shoulder as 14 in the member 10 which forces the valve 50 off its seat against the force of the spring 63. Thus, the act of coupling the members 10 and 11 unseats the valve 50 and opens a passage through the member 11 to the conduit 42; conversely, separating these members causes the valve 50 to seat and close the passage through the member 11.

An important feature of this invention is the cooperating annular sealing surfaces formed by the face 16 of the extension 13 and the gasket 15, which together with the dogs 17 serve to accurately locate the extensions 12 and 13 in substantially the same relative axial position whenever the coupling members are coupled and to maintain them in this position. In this way the abutment or shoulder 14 which engages the extension or wings 62 of the valve 50, is always effective to move the valve closure 50 to a predetermined position in the chamber 58 whereby the passages about the valve 50 to the opening through the coupling on either side of the valve are always substantially equal. This is important in securing the optimum flow through the coupling.

Another feature is that the force exerted by the spring 63 tending to seat valve 50 acts, when the members 10 and 11 are coupled, to urge the members axially apart. As previously pointed out, the coupling means comprising dogs 17 and shoulder 18 are so arranged that when the members 10 and 11 are coupled, any force urging the members axially apart acts to retain the dogs 17 in coupling position, hence the force exerted by spring 63 operates to retain the dogs 17 against uncoupling, supplementing the force supplied by the resilience of the gasket 15.

Figures 7, 8 and 9 illustrate a modified form of coupling incorporating a pair of valves for automatically closing both conduits. The general structure of this coupling is substantially the same as the first form, comprising a pair of tubular members 110 and 111 with telescoping extensions 112 and 113, a sealing ring 115, locking dogs 117 cooperating with a shoulder 118 and an operating ring 119. The member 111 is provided with a valve 150 having guide wings 162 and which operates to close the passage through the member 111 when the members 110 and 111 are separated as in the previously described form. However, instead of the valve 150 being unseated by engagement with a fixed shoulder, the wings 162 enage another and similar valve 70 in the member 110, the valves operating to mutually and substantially simultaneously unseat each other when the members are coupled. The extension 112 is provided with a ported wall forming a seat 71 for the valve 70, which is accommodated in a chamber 72 formed on the extension 112 by a cylindrical wall 73. This chamber is closed by an interiorly threaded cap 74 with a reduced end 75 adapted to have a conduit secured thereon as before. A suitable gasket 76 is interposed between the cap 74 and the end face of the wall 73. The valve 70 includes a head or body portion 77 with a resilient facing 78 for cooperating with the seat 71, and guiding wings 79 which cooperate with the inner surface of the wall 73 to guide the valve for axial movement. By threading the cap 74 on the exterior of the wall 73, it is possible to provide for the necessary movement of the valve 70 as well as to have the wings 79 sufficiently long to satisfactorily guide the valve without having a long coupling member. A compression spring 80 confined between the valve 70 and the cap 74 urges the valve 70 to seat.

It will be apparent that when the members 110 and 111 are separated as shown in Figure 9, the valve 150 will be urged to its seat 160 by the spring 163, closing the opening through the member 111, and the valve 70 will be urged to its seat 71 by the spring 79, closing the opening through the member 110. When the members 110 and 111 are coupled, as shown in Figure 7, the ends of the wings 162 of the valve 150 engage the end of an extension 81 on the valve 70 and the valves are mutually unseated, opening the passage through the members 110 and 111. To prevent the valve 150 being moved so far inwardly of the chamber 158 as to restrict the opening between the chamber and the associated conduit, a stop is provided which comprises a spring ring 82 encircling the wings 162 and suitably secured thereto, as by engaging a groove 83 formed in the wings and adapted to engage a shoulder 84 in the extension 113 upon a desired movement of the valve 150.

Means are also provided to limit the movement of the valve 70 away from its seat 71 to insure against restriction of the opening between the chamber 72 and the conduit connected to the member 110. Thus, the wings 79 are arranged to engage the outermost coil of the spring 80, which is in contact with the cap 74. This limits the opening movement of the valve 70. The arrangement is such that, as will be apparent from an inspection of Figure 7, when the members 110 and 111 are connected, the wings 162 of the valve 150 and the extension 81 of the valve 70 are in contact, valve 150 is substantially at the limit of its movement due to the engagement of the ring 83 with the shoulder 84 and the valve 70 is also substantially at the limit of its movement with the wings 79 in engagement with the outer coil of the spring 80. It will be understood that appropriate clearances must be provided on the contacting parts to allow for manufacturing tolerances as well as the resilience of the gasket 115. However, these clearances are so small as to be of no effect on the important advantages of this arrangement which will now be pointed out. As in the form of the invention utilizing a single valve, the forces exerted by the springs 80 and 163 urging the respective valves 70 and 150 toward closed position also urges members 110 and 111 apart and thus in a similar manner assists the resilience of the gasket 115 in retaining dogs 117 in coupling position.

The necessity of preventing excessive movement of the valve member from its seat has just been explained; it is also necessary that the valve member be moved a sufficient distance from its seat to provide proper opening between the valve and its seat. As previously mentioned, it is desirable that the valve member when unseated, be always moved to a predetermined position. The described arrangement insures that each valve member 70 or 150 will always assume a predetermined position in its respective chamber 72 or 158 when unseated in response to coupling of the members 110 and 111, without the need of providing carefully balanced springs 80 and 163 for seating the valves. This position can be so determined that a minimum restriction occurs in the coupling members 110 and 111 of a given length of chamber 72 or 158. Thus, referring to Figure 7 it will be seen that the passage B between valve member 150 and the opening through the seat 160 is substantially unobstructed while the passage C between the valve member 150 and the opening between the conduit and chamber 158 is somewhat obstructed by the spring 163. Accordingly, for optimum results, in its open position the valve member 150 must be placed to substantially equalize the effective openings of passages B and C, due to regard being had to friction losses. Tests have shown that a small deviation from such optimum position results in a marked loss of fluid handling capacity of the coupling. A somewhat similar situation exists in connection with the valve member 70, it being desirable to accurately position it when open to equalize the passages D and E. The disclosed arrangement serves to accurately move the valve members to open position.

Another important feature of this arrangement is that the valve members when open are positively held against movement in either direction. Thus, the fluid even though flowing through the coupling at a great velocity, is prevented from moving either valve member by itself or the pair of valve members as a unit toward or away from the seats in the manner of a check valve, with resulting restriction in the fluid flow.

The provision of the extension 81 on the valve member 70 enables the use of wings 162 on the other valve member 150 which are of such length as to be wholly within the coupling member 111 carrying the valve member, when the valve member is seated. Thus, as clearly shown in Figure 9, the ends of the wings 162 of the valve member 150 are substantially flush with the face of the tubular extension 113, when the coupling members 110 and 111 are separated and the valve member 150 is seated. Similarly, the extension 81 is wholly within the tubular extension 112 of the member 110 when the valve member 70 is seated. This is an important advantage since in this way accidental unseating of either valve member 150 or 70 is prevented and possibility of damage to the wings or valve members is avoided.

By referring to Figure 8 it will be seen that the extension 81 is formed of wings 105 which do not materially obstruct the flow of fluid past the wings 162 regardless of the relative angular positions of the valve members 70 and 150. Hence it is not necessary to provide any means for angularly positioning the valve members 70 and 150 or coupling members 110 and 111 in any definite relationship when the coupling members are connected.

Either form of coupling as described may be operated as a self releasing coupling by slight modifications, as disclosed in said copending application. For this purpose the coupling is arranged to be supported by means of the operating ring 19 in lieu of the flange 44 and which as indicated by broken lines in Figure 1 is provided with a flange 131. This flange it is to be understood serves to mount the coupling in a desired manner. This action can be visualized in connection with Figure 1. Thus, assuming the ring 19 is fixed as by the flange 131 and the member 11 is pulled to the right as indicated by the arrow 133, the member 10 carrying the dogs 17 will move with it causing the ends 30 of the dogs 17 to engage the reduced portion 31 of the ring 19 and release the dogs. This is the same action as that previously described to release the dogs involving a movement of the ring 19 to the left as indicated in Figure 3. It will be apparent that by appropriate choice of the part by which the coupling is restrained or supported, axial force tending to separate the coupling members may be caused to increase the locking effect of the means preventing disconnection of the members, or to effect such disconnection.

It will be readily understood that the use of a valve in either one or both members of a coupling used in this manner, which valve operates automatically to close the passage through the coupling member when the members are separated and to open the passage when the members are coupled is of great advantage.

What is claimed is:

1. In a coupling comprising a pair of members having tubular extensions adapted to be secured in telescopic relationship, means forming cooperating annular sealing surfaces respectively on said members and serving to limit relative axial movement between said members in coupling direction, releasable means securing said members with said surfaces in sealing contact and optionally preventing separation of the members, valve means in one of said members for controlling the passage therethrough and including a valve closure movable in an axial direction between passage opening and passage closing position, means resiliently opposing movement of said closure to open position, said closure having an extension, and means forming an abutment in said other member for engaging said extension when the members are coupled, to move said valve closure to open position, said securing means, said sealing surfaces and said abutment means cooperating with said extension to move said valve closure to a predetermined open position upon movement of said members to coupled relation, and to positively maintain said valve closure in said open position.

2. In a coupling comprising a pair of members having tubular extensions adapted to be secured in telescopic relationship, means forming cooperating annular sealing surfaces respectively on said members and serving to limit relative axial movement between said members in coupling direction, releasable means securing said members with said surfaces in sealing contact and optionally preventing separation of the members, valve means in one of said members for controlling the passage therethrough and including a valve closure movable in an axial direction between passage opening and passage closing position, means resiliently opposing movement of said closure to open position, said closure having an extension, and means forming an annular surface in said other member for engaging said extension when the members are coupled to move said valve closure to open position, whereby the passage through said member is substantially unobstructed.

3. In a coupling comprising a pair of members having tubular extensions adapted to be secured in telescopic relationship, means forming cooperating annular sealing surfaces respectively on said members and serving to limit relative axial movement between said members in coupling direction, releasable means securing said members with said surfaces in sealing contact and optionally preventing separation of the members, valve means in one of said members for controlling the passage therethrough and including a valve closure movable in an axial direction between passage opening and passage closing position, means resiliently opposing movement of said closure to open position, said closure having an extension, and means forming an abutment in said other member and axially spaced from the contacting sealing surfaces for engaging said extension when the members are coupled, to move said valve closure to open position, said securing means, said sealing surfaces and said abutment means cooperating with said extension to move said valve closure to a predetermined open position upon movement of said members into coupled relation, and to positively maintain said valve closure in said open position.

4. In a valved coupling, a pair of axially separable tubular members, valve means associated with at least one of said members for controlling the opening therethrough, means on the other member for opening said valve means when the members are coupled, means exerting a force yieldingly resisting opening movement of said valve means and thereby urging said members apart, and means for coupling said members comprising locking dogs and a cooperating shoulder respectively on said members, said dogs and said shoulder having interengaging surfaces disposed at a wedge angle, with respect to the direction of movement of said surfaces into engagement, lying within the self-locking range, whereby when the members are coupled the said force-exerting means acts to retain the dogs in locking position.

5. In a valved coupling, a pair of axially separable tubular members, valve means associated with at least one of said members for controlling the opening therethrough, means on the other member for opening said valve means when the members are coupled, coil spring means yieldingly resisting opening movement of said valve means and thereby urging said members apart, and means for coupling said members comprising locking dogs and a cooperating shoulder respectively on said members, said dogs and said shoulder having interengaging surfaces disposed at a wedge angle, with respect to the direction of movement of said surfaces into engagement, lying within the self-locking range, whereby said dogs are retained in locking engagement with said shoulder by the force exerted by said spring means.

6. In a valved coupling, a pair of axially separable tubular members, valve means associated with each of said members for controlling the openings therethrough, the valve means associated with each member being adapted to be opened by engagement with means on the other member when the members are coupled, means associated with each of said valve means for exerting a force resisting opening movement thereof and thereby urging said members apart, and means for coupling said members comprising locking dogs and a cooperating shoulder respectively on said members, said dogs and said shoulder having interengaging surfaces disposed at a wedge angle, with respect to the direction of movement of said surfaces into engagement, lying within the self-locking range, whereby said dogs are retained in locking engagement with said shoulder by said force-exerting means.

7. In a valved coupling, a pair of axially separable tubular members, valve means associated with each of said members for controlling the openings therethrough, each of said valve means being adapted to engage and open the other valve means when the members are coupled, spring means yieldingly resisting opening movement of said valve means and thereby urging the members apart, resilient sealing means on one of said members adapted to be engaged and axially deformed by means on the other member when the members are coupled, said sealing means when so deformed exerting a force urging said members apart, and means for coupling said members comprising locking dogs and a cooperating shoulder respectively on said members, said dogs and said shoulder having interengaging surfaces disposed at a wedge angle, with respect to the direction of movement of said surfaces into engagement, lying within the self-locking range, whereby said dogs are retained in locking engagement with said shoulder by the forces exerted by said spring means and said deformed resilient sealing means.

8. In a valved coupling, a pair of axially separable tubular members, valve means associated with at least one of said members for controlling the opening therethrough, means on the other member for opening said valve means when the members are coupled, means exerting a force yieldingly resisting opening movement of said valve means and thereby urging said members apart, and means for coupling said members comprising locking dogs and a cooperating shoulder respectively on said members, said dogs and said shoulder adapted to interlock upon coupling of the tubular members, whereby force exerted by said force exerting means tends to retain the shoulder and dogs in interlocked condition.

9. In a valved coupling, a pair of axially separable tubular members, valve means associated with at least one of said members for controlling the opening therethrough, means on the other member for opening said valve means when the members are coupled, means exerting a force yieldingly resisting opening movement of said valve means and thereby urging said members apart, resilient sealing means on one of said members adapted to be engaged and axially deformed by means on the other member when the members are coupled, said sealing means when so deformed exerting a force urging said members apart, and means for coupling said members comprising locking dogs and a cooperating shoulder respectively on said members, said dogs and said shoulders adapted to interlock upon coupling of the tubular members, whereby said dogs are retained in locking engagement with said shoulder by the forces exerted by said force exerting means and said deformed resilient sealing means.

10. In a valved coupling, a pair of axially separable tubular members, valve means associated with at least one of said members for controlling the opening therethrough, means on the other member for opening said valve means when the members are coupled, means exerting a force yieldingly resisting opening movement of said valve means and thereby urging said members apart, and means for coupling said members comprising cooperative locking instrumentalities respectively on said members, said instrumentalities adapted to interlock upon coupling of the tubular members, whereby force exerted by said force exerting means tends to retain said locking instrumentalities in interlocked condition.

IRENE LANE WIGGINS,
Executrix of the Last Will and Testament of Earl B. Wiggins, Deceased.

REFERENCES CITED

The following references are of record in the file of this patent:

UNITED STATES PATENTS

| Number | Name | Date |
| --- | --- | --- |
| 1,850,879 | Hunt | Mar. 22, 1932 |
| 2,135,221 | Scheiwer | Nov. 1, 1938 |
| 2,255,333 | Scheiwer | Sept. 9, 1941 |
| 2,279,146 | Schneller | Apr. 7, 1942 |
| 2,086,569 | Meyer | July 13, 1937 |
| 2,135,222 | Scheiwer | Nov. 1, 1938 |
| 109,695 | Westinghouse, Jr. | Nov. 29, 1870 |
| 879,880 | Landau | Feb. 25, 1908 |
| 2,322,449 | Johnson et al. | June 22, 1943 |
| 1,565,349 | Zerk | Dec. 15, 1925 |
| 1,916,284 | Ragan | July 4, 1933 |
| 1,559,178 | Podnar | Oct. 27, 1925 |
| 1,465,648 | McNeill | Aug. 21, 1923 |
| 1,680,138 | Edelmann | Aug. 7, 1928 |